United States Patent [19]

Mullett

[11] 4,295,401
[45] Oct. 20, 1981

[54] APPARATUS FOR DISPOSING OF RADIOACTIVE FUEL CHANNELS

[75] Inventor: William L. Mullett, Dunedin, Fla.

[73] Assignee: NUS Corporation, Rockville, Md.

[21] Appl. No.: 709,745

[22] Filed: Jul. 29, 1976

[51] Int. Cl.$^3$ .................. G21C 19/32; B26D 11/00
[52] U.S. Cl. .................................. 83/864; 83/187; 83/487; 83/925 R; 422/903
[58] Field of Search .............. 252/301.6 W, 301.15; 83/54, 430, 440, 924, 864, 187, 487, 925 R; 176/28, 37, 91 R; 422/159, 903

[56] References Cited

U.S. PATENT DOCUMENTS 3,173,320 3/1965 Dabernard et al. .................. 83/102
3,802,996 4/1974 Jones ........................................ 176/38

OTHER PUBLICATIONS

Stoller, S. M. et al., Eds., Reactor Handbook, vol. II, Fuel Reprocessing, Interscience Publishers, Inc., N.Y. 1961, pp. 23-48.

Primary Examiner—Deborah L. Kyle
Attorney, Agent, or Firm—Sughrue, Mion, Zinn, Macpeak & Seas

[57] ABSTRACT

Irradiated tubular rectangular fuel channels from a nuclear reactor are temporarily stored under water. In order to dispose of these highly radioactive channels and to ship them to permanent burial grounds, the channels must be placed in specially designed shipping casks under water. In order to reduce the volume of the channel so as to economize on the use of the casks, the channels are cut along their longitudinal edges to form four plates which are then nested before being placed in the storage casks, thereby greatly increasing the number of channels which may be stored in each cask. The cutting is done under water by an apparatus having four roller cutters which are positioned along the outside of the four edges or corners of a channel and are moved longitudinally down the channel edges in a reciprocating motion until the four side plates of the channel are severed.

5 Claims, 11 Drawing Figures

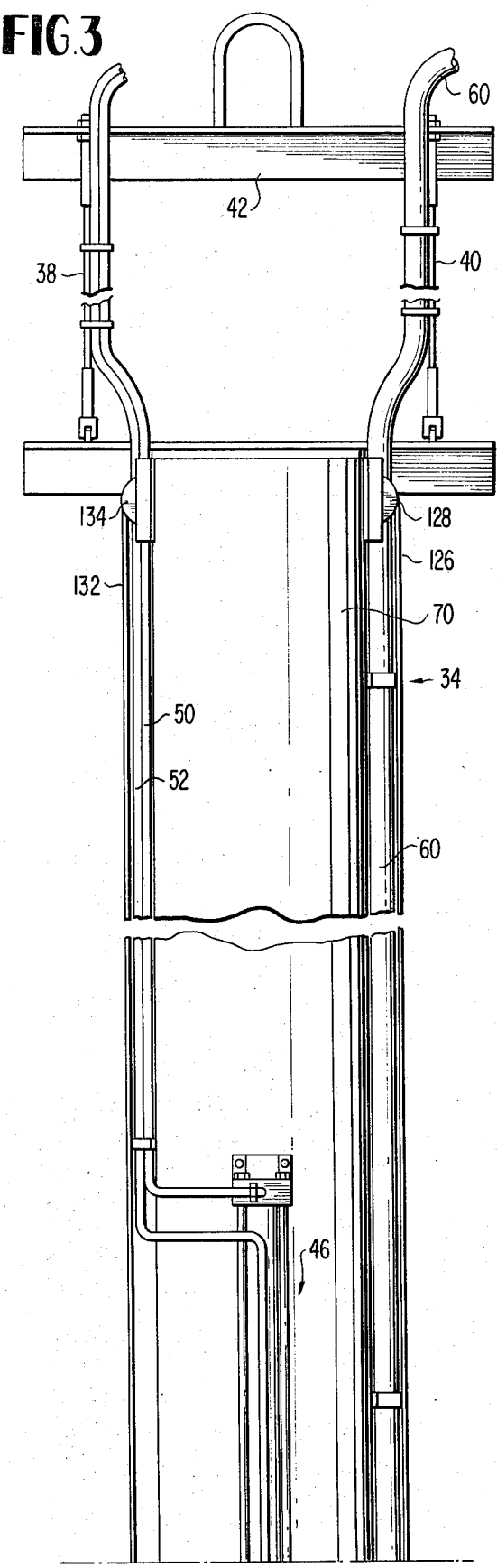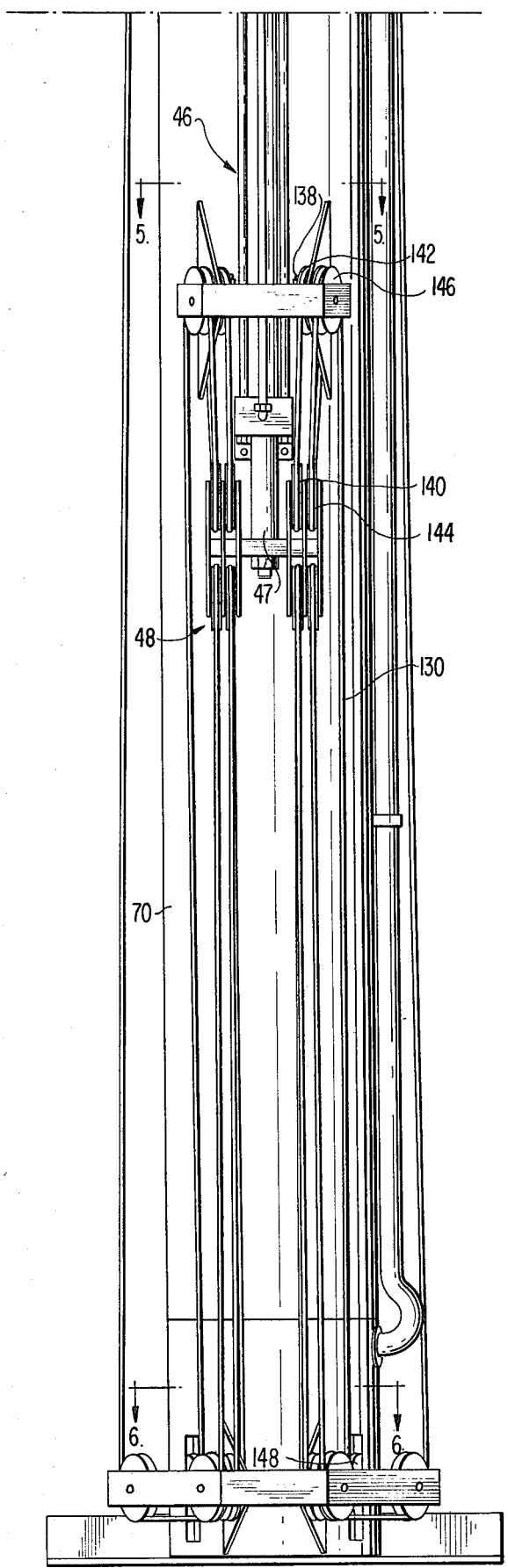
FIG.3

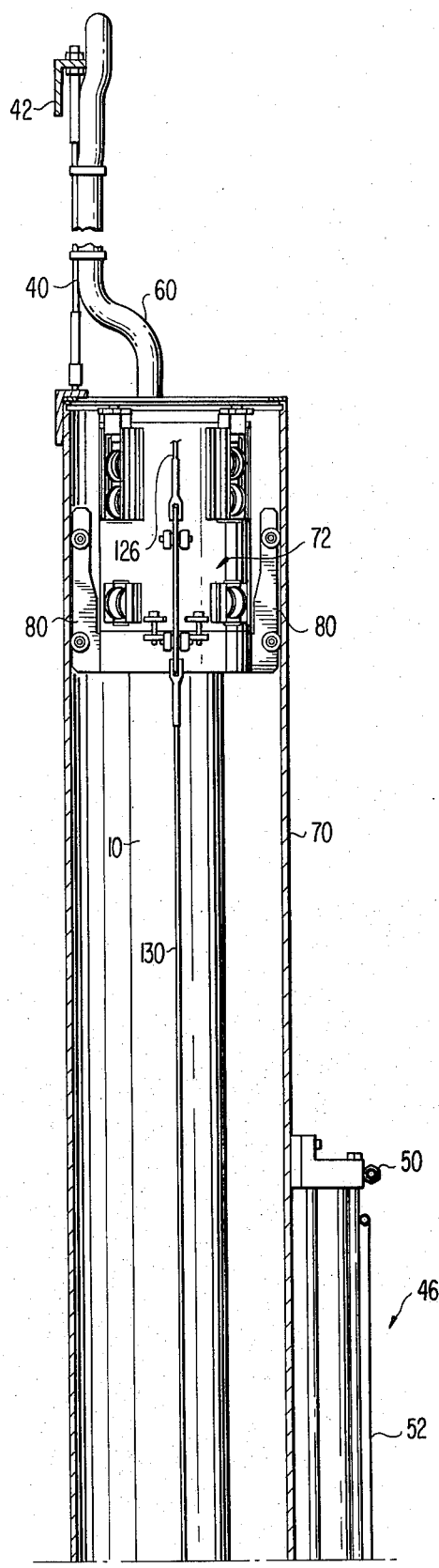
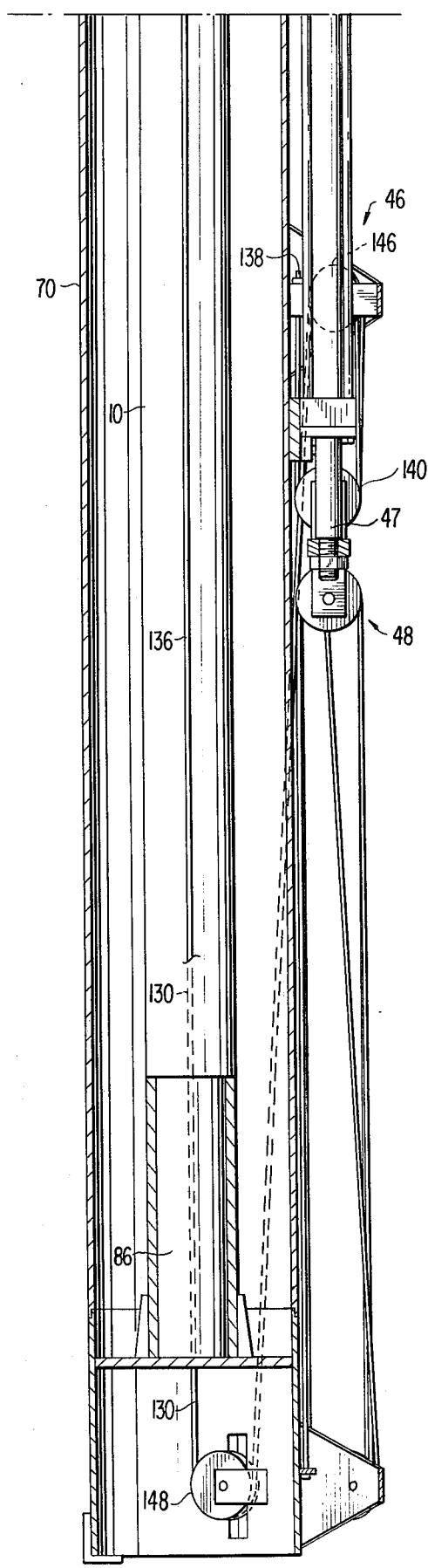
FIG.4

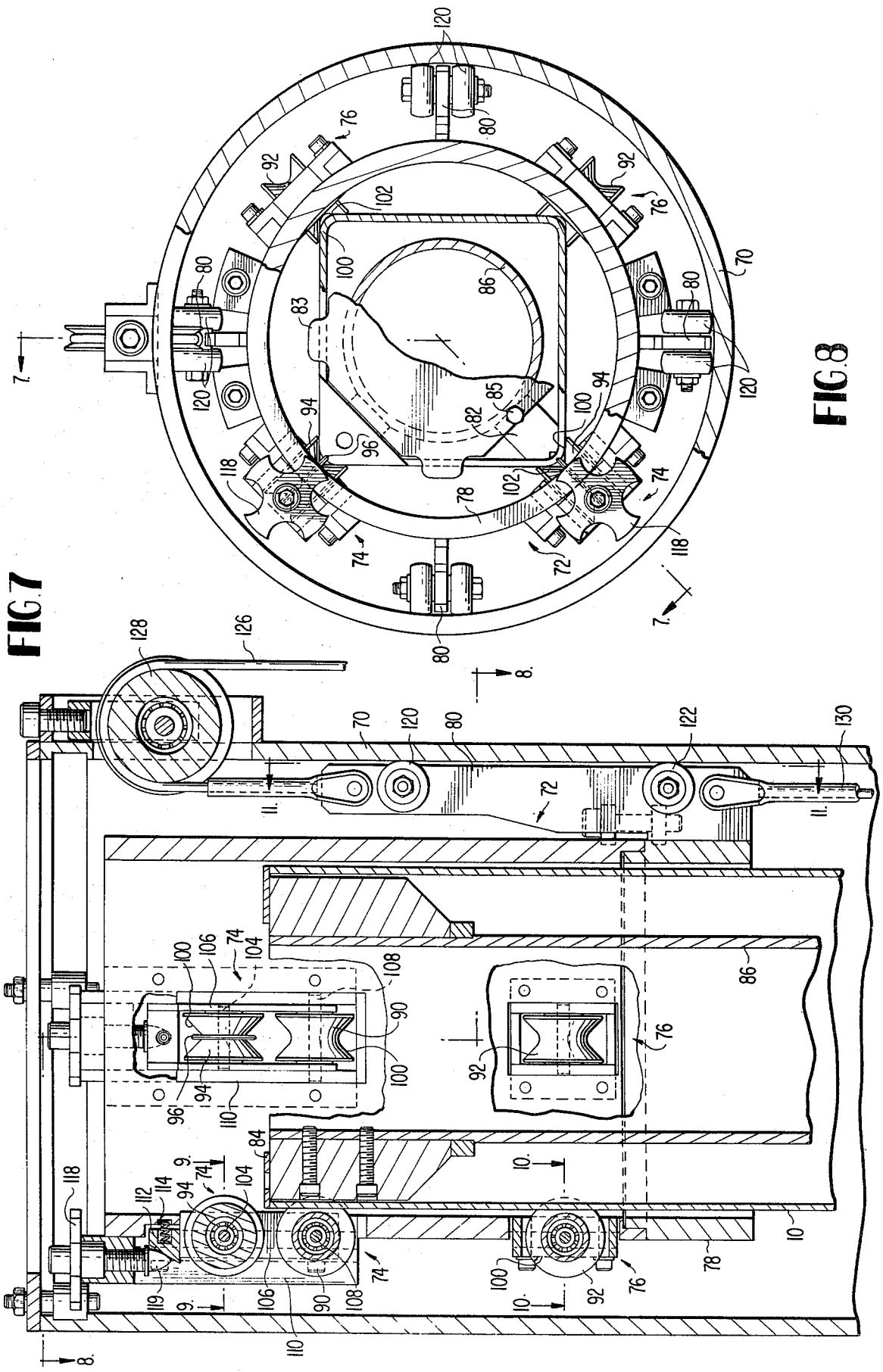

APPARATUS FOR DISPOSING OF RADIOACTIVE FUEL CHANNELS

BACKGROUND OF THE INVENTION

The invention relates generally to the field of disposal of highly radioactive materials, and, more particularly, to a method and apparatus for reducing the volume of radioactive rectangular tubular fuel channels stored under water.

In one type of boiling water nuclear reactor (BWR), there is a fuel assembly consisting of fuel rods surrounded by a fuel channel. The channel is a 5.278 inch square tube, approximately fourteen feet long, with open ends and made of zircalloy. The channels typically have a wall thickness of 0.080, 0.100 or 0.120 inch.

There are a large number of these fuel assemblies in a BWR reactor, and one-third of these assemblies are normally replaced each year. Even though the fuel channels are normally reused after the fuel rods are removed, for various reasons it has been determined that in some cases, they cannot be resued, but must be replaced, thereby requiring these highly radioactive fuel channels to be disposed of in a safe and economical manner.

These used fuel channels are highly radioactive for two reasons. First, the zircalloy metal itself has become somewhat radioactive during operation of the nuclear reactor, and second, there is formed on the outside of the channel a crust or crud which itself is also highly radioactive.

The present method of disposing of such radioactive fuel channels is to place them in a special heavy metal shipping cask, and transport them to one of the five federal disposal grounds in the country where they are then buried. However, the rental for these casks is quite expensive, and it would be highly desirable to reduce the effective volume of these tubular fuel channels thereby to increase the number of channels which can be shipped in each cask.

There are presently hundreds of these fuel channels stored in water-filled fuel pools at numerous BWR-nuclear power plants. Due to the radiation levels of these fuel channels, they must be handled under water, thus posing one problem. Another problem is that the handling operation must result in as little debris as possible, since such debris is radioactive and will contaminate the pool water.

One suggestion has been to crush the fuel channels in order to reduce their volume, but this procedure would result in a great deal of debris in the form of flaked-off radioactive crust dislodged from the channel during the crushing operation. In addition, the volume reduction would not be optimum using this method of compaction.

SUMMARY OF THE INVENTION

Therefore, the broad object of this invention is to provide a method and apparatus for disposing of these fuel channels, which are stored under water, by minimizing the effective volume of each fuel channel, with a minimum of radioactive debris, such that each shipping cask can accommodate a much larger number of fuel channels than would otherwise be possible.

A more specific object of this invention is to cut under water a radioactive rectangular tube into four side plates which are then nested or stacked as they are placed in a shipping cask which is also under water.

Another object of the invention is to provide an apparatus into which a rectangular fuel channel may be placed under water, such apparatus being provided with four roller cutters which travel along the four longitudinal edges or corners of the fuel channel to cut the fuel channel simultaneously and efficiently into four side plates which are then placed in a shipping cask, thereby greatly increasing the total number of fuel channels which may be accommodated by each shipping cask.

BRIEF DESCRIPTION OF THE DRAWING

FIG. 3 is a front elevation of the apparatus of the invention;

FIG. 4 is a side sectional view of the apparatus of FIG. 3;

FIG. 7 is a vertical section of the cutter head assembly taken along line "7—7" of FIG. 8;

FIG. 8 is a section taken along line "8—8" of FIG. 7;

DESCRIPTION OF THE PREFERRED EMBODIMENT

Figure 1:
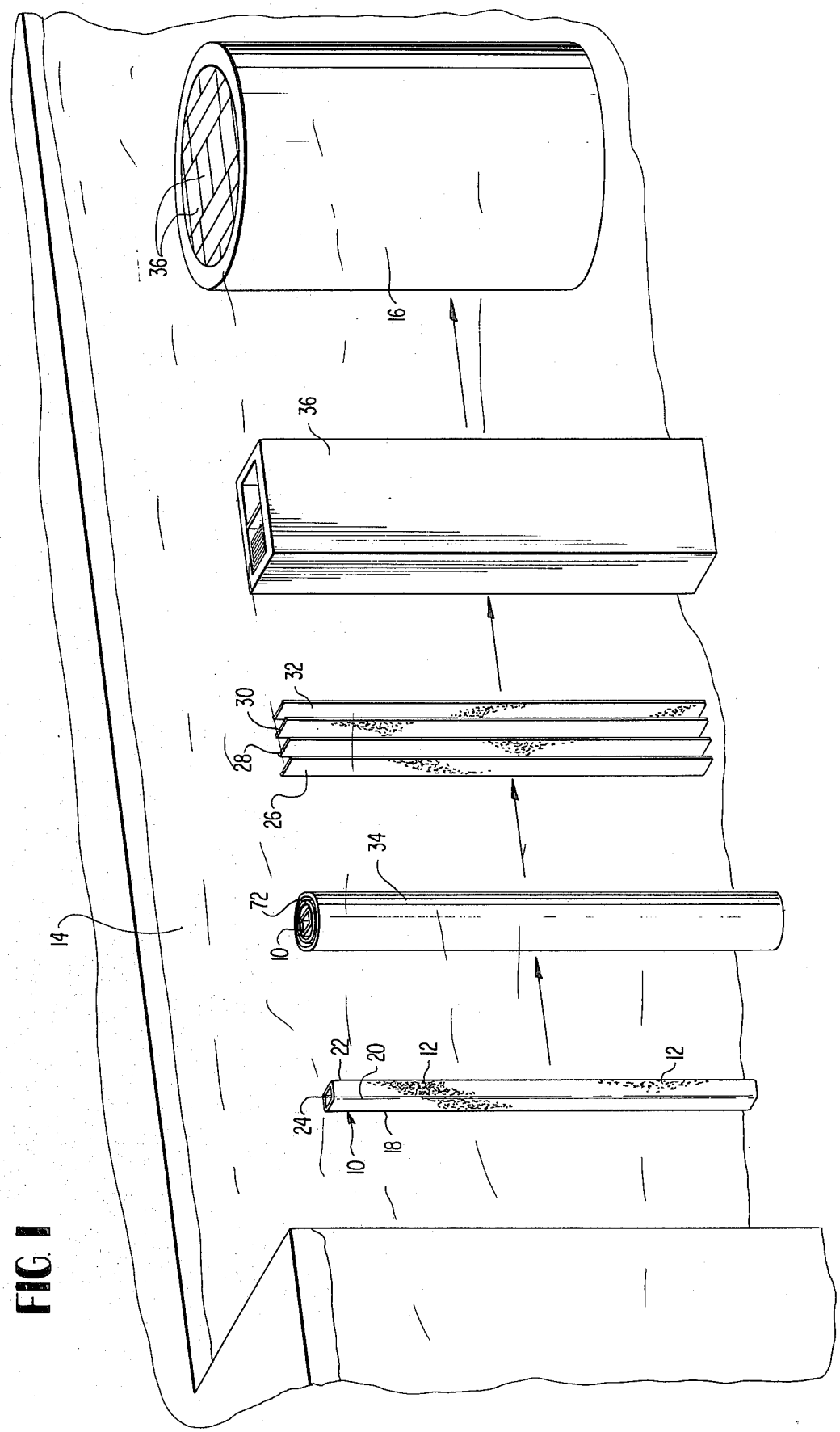
FIG. 1 is a schematic illustration of the method of this invention.

Reference numeral 10 designates a spent highly radioactive fuel channel 10, typically made of zircalloy which has become highly radioactive, and reference numeral 12 designates a radioactive crust or crud which is formed on the channel during its use in a nuclear reactor. The illustrated channel is an approximately five inch square tube which is approximately fourteen feet long with open ends. The thickness of the walls of the channel is typically in the range of 0.080 to 0.12 inch.

FIG. 1 illustrates the method of the invention. The spent radioactive fuel channel is stored in a pool 14 of water. In order to ship such fuel channels to the federal burial grounds within the country, the channels must be stored in a radioactive-shielded shipping cask 16. In accordance with this invention, in order to reduce the volume of the fuel channel for shipping, the channel is cut along its four longitudinal corners 18, 20, 22 and 24 to sever the channel into four rectangular side plates 26, 28, 30 and 32 which may then be nested to form a stack having a volume approximately ten times less than that of the fuel channel 10. In practice, after the fuel channel is severed into the side plates, the side plates are removed from the cutting apparatus 34 by suitable mechanical manipulator means controlled by an operator above the pool and stacked in a suitable disposal basket 36. Several side plates are stacked in each disposal basket, and then several disposal baskets are placed in the shipping cask 16. Since available shipping casks are of various heights, the fuel channel 10 may be cut into shorter lengths to accommodate the dimensions of the cask. Since the upper end of the fuel channel may have some projecting members which prevents tight nesting, this upper end may also be transversely severed and handled as a separate radioactive element.

As will be explained in more detail in connection with the description of the preferred apparatus of the invention, the severing operation is accomplished by roller cutter blades, thereby reducing to a minimum the production of metal chips and any radioactive debris caused by flaking off of the radioactive crust during the cutting operation. Any chips or radioactive debris is collected by suitable filtering means for subsequent disposal.

Figure 2:
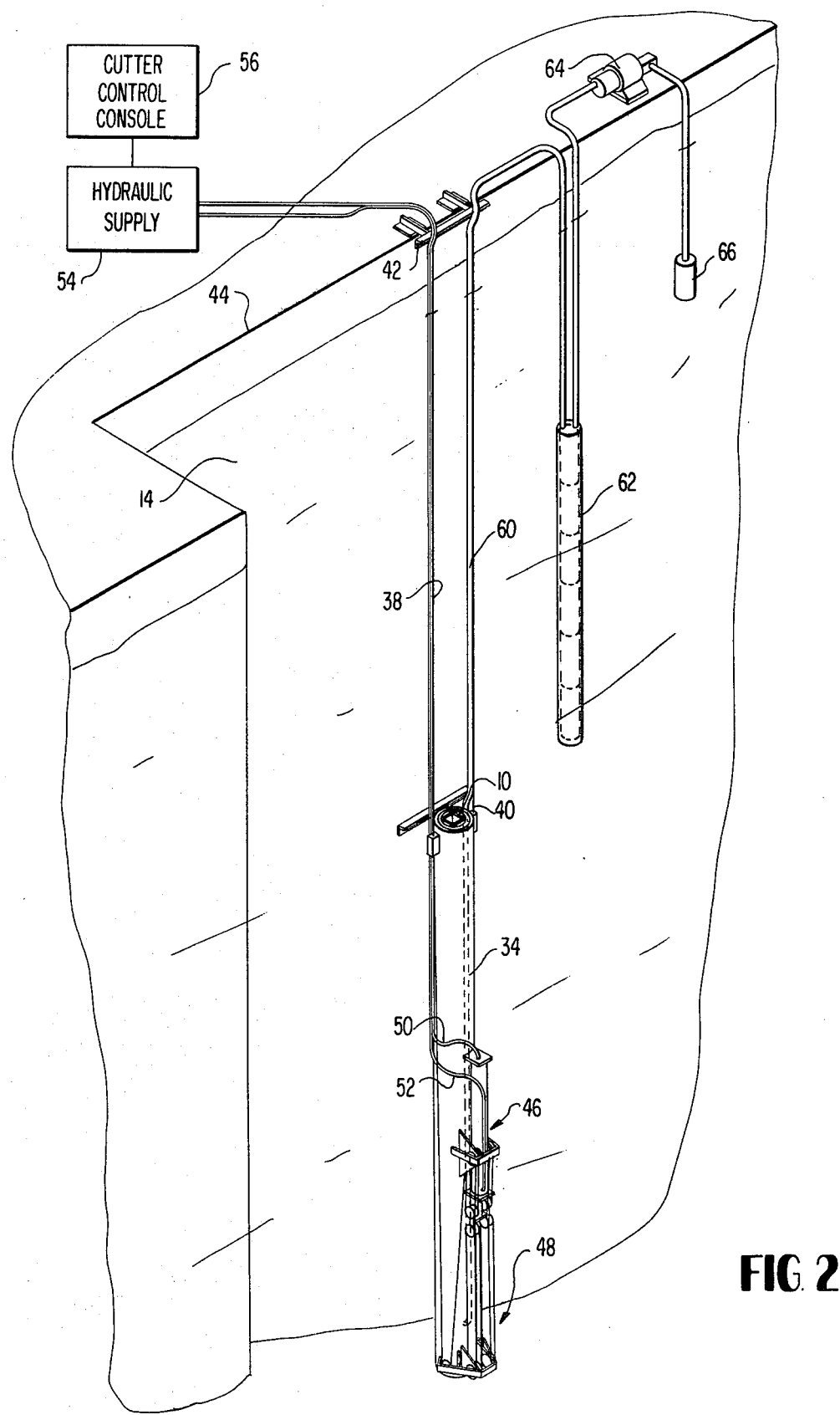
FIG. 2 illustrates the environment in which the preferred apparatus of the invention is used.
Figure 5:
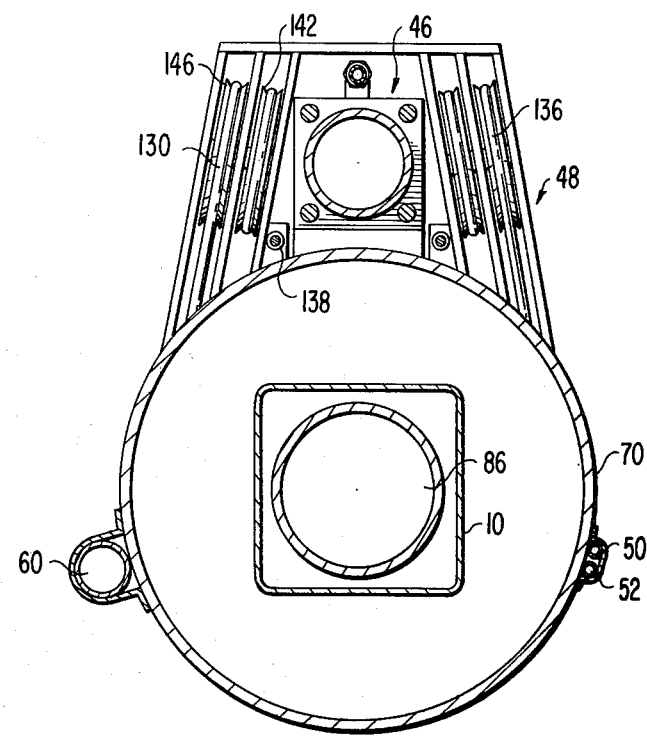
FIG. 5 is a sectional view taken along line "5—5" of FIG. 3.
Figure 6:
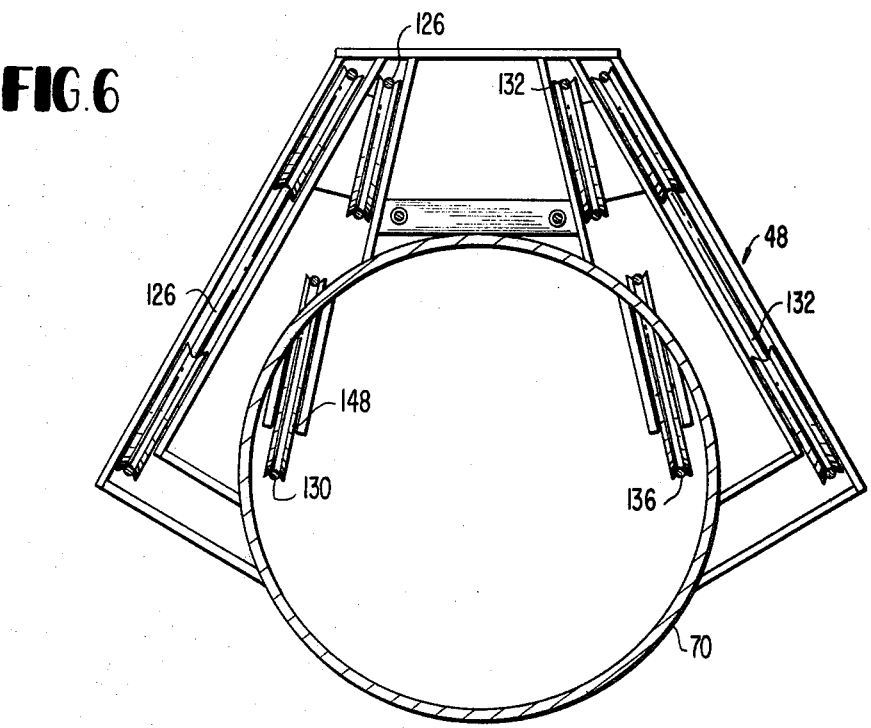
FIG. 6 is a sectional view taken along line "6—6" of FIG. 3.
Figure 9:
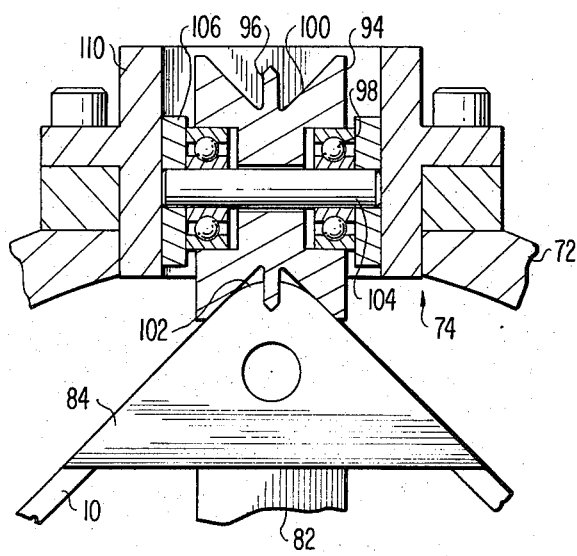
FIG. 9 is a section taken along line "9—9" of FIG. 7.
Figure 10:
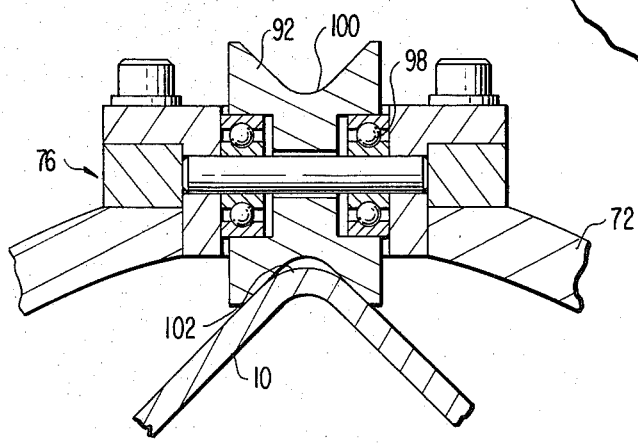
FIG. 10 is a section taken along line "10—10" of FIG. 7.
Figure 11:
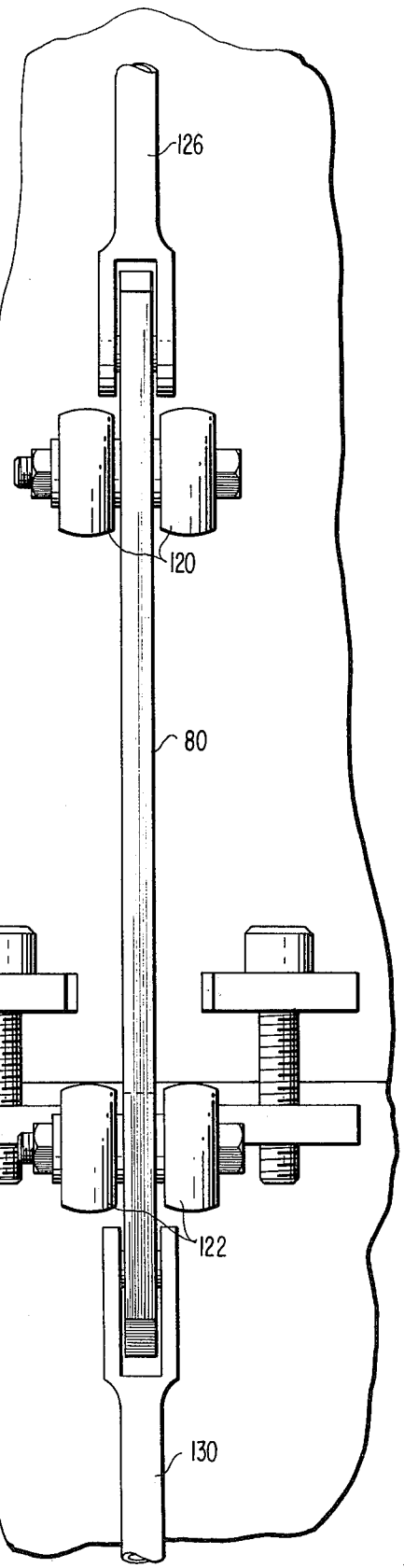
FIG. 11 is a section taken along line "11—11" of FIG. 7.

FIG. 2 schematically illustrates the preferred apparatus of the invention as applied to the disposal of spent fuel channels which are stored under water in a pool. A fuel channel 10 is shown already inserted in the corner cutter apparatus 34 which is supported by cables 38 and 40 from a bracket 42 attached to the edge 44 of the pool 14. A hydraulic cylinder and piston actuator 46 is fixed to the lower end of the outside of the apparatus 34 and actuates the fuel channel cutter assembly via a pulley and cable arrangement 48 which will be described in more detail below. The actuator 46 is connected via a pair of hydraulic lines 50 and 52 to a hydraulic power supply 54 whose operation is controlled by a cutter control console 56. Of course both the power supply and the cutter control console are located at the top of the pool. The support cables 38 and 40 maintain the cutter apparatus 34 in a vertical orientation.

In order to prevent the pool water from being contaminated by metal chips or radioactive debris which may be flaked off of the fuel channel 10 during the cutting operation, a filtering system is provided to remove this debris from the apparatus 34. To achieve filtering, the water is pumped from the lower end of the apparatus 34 via a conduit or hose 60, and intermediate filter assembly 62, a suction pump 64 and a final filter 66 from which the filtered water is discharged back into the pool. As shown in FIG. 3, note that both the hydraulic lines 50, 52 and the filter hose 60 are strapped to the support cables 38 and 40. Any radioactive debris is trapped in the filters 62 and 66 for subsequent disposal.

FIGS. 4-7 illustrate the cutter apparatus 34 used in this invention. The apparatus consists of an outer cylindrical tubular housing 70 which is suspended by cables 38 and 40 fixed to the support bar and bracket 42 which in turn is hooked to the pool's top edge. Mounted on the outside of the housing 70 at the lower end thereof are the piston and cylinder actuator 46 and the cable and pulley assembly 48.

Mounted for longitudinal movement within the outer housing 70 is a cutter assembly 72 having four roller cutter blades 74 in engagement with the four longitudinal corners or seams, respectively, of the fuel channel 10. The cutter assembly 72 is mounted on a carrier assembly 78 which is supported within the inside walls of the outer housing 70 by four guide assemblies 80 which are driven in a reciprocating manner along the length of the fuel channel 10.

In FIGS. 4-7, the cutter assembly 72 is shown in its upwardmost position generally opposite an upper mandrel assembly 82 which is disposed within the inside corners of the fuel channel 10 to act as a backing member for the cutter blades 74. Mandrel assembly 82 is fixed to cylindrical support member 86 extending the length of the fuel channel. As indicated, a duplicate mandrel assembly 82 is affixed to the lower end of support member 86.

FIGS. 8-12 are sectional views showing the details of the cutter assembly 72.

As shown in FIG. 8, the channel 10 may be supported on top of the mandrel assembly 82 by means of one or more inwardly extending straps 84 which are an integral part of a particular fuel channel to which this invention is addressed. (In such fuel channels, the upper end thereof may be transversely severed from the remainder of the channel in order to permit tighter nesting of the severed side plates.)

It is seen that the cutter assembly 72 consists of four sets of three rollers which engage respective corners of the fuel channels. Two of the rollers 90 and 92 in each set are guide rollers, whereas the third roller 94 is a cutter roller having a cutter blade 96. These rollers are all mounted for rotation on stainless steel ball bearings, such as ball bearing 98.

Each of the rollers 90, 92 and 94 has a concave recess 100 which mates with the corresponding slightly rounded corner 102 of the fuel channel 10. Thereby, all three rollers, including the cutting roller 94, act as guide rollers to keep the cutter assembly positioned relative to the fuel channel 10 so that the cutter blades 96 bisect the corner angles of the fuel channel 10, thereby assuring maximum nesting and compaction of the four side plates after they are severed.

The cutter roller 94 is mounted for rotation on a shaft 104 which is journaled in a member 106. The upper guide roller 90 is mounted for rotation on a shaft 108 which is journaled in the member 110 such that the member 106 carrying the cutter roller 94 is pivotable about the shaft 108. The member 106 is welded to a cam 112 which is spring-biased outwardly by a spring 114. The lower end of a cutter adjusting screw 116 engages the inclined surface of the cam 112, and an adjusting knob 118 is fixed to the upper end of the adjusting screw 116. By moving the adjusting screw downwardly, the cutter blade 94 is moved inwardly to increase the depth of cut in the walls of the fuel channel 10. In operation, the cutter assembly starts in its upwardmost position, and the cutter rollers 94 are adjusted for the desired depth for the first downward cutting stroke. Upon return of the cutter assembly to its upper position and before it begins its next downward stroke, the adjusting knob 118 is turned to move the cutter blade inwardly to increase the depth of cut for the next downward stroke. All four cutter blades 94 may be simultaneously so adjusted at the top of each stroke until the four side plates are completely severed.

It is noted that the mandrel assembly 82 is slightly rounded at the extremities thereof to mate with the curved corners of the fuel channel, and that each projection of the mandrel assembly has a small notch therein to accommodate the cutting blade 96 on the cutter roller 94.

The cutter assembly 72 and carrier assembly 78 are supported within the outer housing 70 by means of the four guide assemblies 80, each of which has an upper double guide roller 120 and a lower double guide roller 122 which engage the inner wall of the housing 70.

Referring to FIGS. 7 and 8, two of the guide assemblies 80 are affixed to and driven by the cable and pulley assembly 48. More specifically, one of the guide assemblies 80 is fixed at its upper end to a cable 126 which passes over an idler pulley 128, and is fixed at its lower end to another cable 130. In like manner, the diametrically opposite guide assembly 80 of FIG. 3 is fixed at its upper end to a cable 132 passing over a second idler pulley 134, and the lower end thereof is fixed to another cable 136 corresponding to the cable 130.

The cable and pulley assembly 48 consists of a series of pulleys located at fixed points on the housing and on a horizontal bar attached to the end of the piston rod 47. This arrangement of pulleys results in a four-to-one mechanical advantage between the travel of the cutter head 72 and the travel of the piston rod 47. In other words for every inch of extension of the piston rod 47 the cutter head 72 will travel four inches. There are four groupings of cable and pulley assemblies but it will be necessary to describe only one as all four operate essentially the same. Reference is made to the right-hand power pulley assembly of FIGS. 3, 4, 5 and 6. Cable 130 is fixedly attached at 138 to the middle portion of casing 70 (FIG. 3). From there the cable runs down to pulley 140 mounted on the end of piston rod 47. The cable then runs up to pulley 142 and back down again to pulley 144 lying adjacent to pulley 140. From there the cable 130 runs up to pulley 146 then down to 148 and into the interior of casing 70. The cable 130 then runs up the inside of the casing to the lower portion of guide assembly 80 and is fixed at this point.

The operation of the illustrated preferred apparatus of the invention may be summarized as follows.

A plurality of spent, highly radioactive fuel channels 10 are stored under water in a pool. The corner cutter apparatus 34 is suspended in a vertical orientation under water from the edge of the pool. A human operator, using suitable mechanical manipulators, places a fuel channel 10 in the apparatus 34 so that the mandrel assembly 82 is inside of the channel. A channel hold down plate 83 is affixed to the upper mandrel assembly 82 by suitable bolts 85. The four roller blades 94 are adjusted by the adjusting screw 116 to the desired depth of cut for the first stroke of the cutting mechanism 72. The hydraulic power supply 54 is operative via the cutter controls console 56 to activate the piston and cylinder arrangement 46 to initiate a downward stroke of the cutter assembly. The pulley and cable arrangement 48, having a four-to-one mechanical advantage relative to the piston stroke, pulls the cutter assembly down to its lowermost position, thereby making a first cut through the longitudinal corners or seams of the fuel channel. The hydraulic power supply then returns the cutter assembly to its upwardmost position, where the adjusting screws are rotated wither individually or simultaneously to move the roller cutters inwardly for the next downward cutting stroke. This operation is continued until the four side plates are severed from the fuel channel. (The fuel channel may also be cut transversely into varying lengths to remove projections thereof which would prevent nesting and to accommodate the height of the ultimate storage casks.) The side plates are then removed by a mechanical manipulator, and several of the plates are then stacked or nested in a disposal basket 36, several of which are then stacked in the shipping cask 16. All of the above operations take place under water. Furthermore, there is provided a filtering system (62, 64 and 66) which removes from the housing assembly 34 and possible metal cutter slivers or radioactive debris produced during the cutting operation by the flaking off of radioactive crust on the exterior surface of the fuel channel. The filtered, uncontaminated water is then returned to the pool.

The operation of the preferred apparatus of the invention thereby provides the means by which highly radioactive BWR fuel channels can be safely and economically shipped from the owner's storage pool for ultimate disposal with minimum infringement on pool space and without degradation of storage pool water.

I claim:

1. Apparatus for disposing of a radioactive rectangular tubular fuel channel comprising elongated housing means for containing therein the tubular channel, and cutter means, mounted on said housing means, for cutting the channel along each longitudinal corner thereof until the channel is severed into four side plates; wherein said cutter means comprises four roller cutter blades respectively engaging the four longitudinal corners of the tubular channel, and motive means on said housing means for simultaneously longitudinally moving said cutter blades in a reciprocating motion along the four longitudinal corners of the tubular channel, whereby severance is achieved by material displacement, as opposed to material removal, so that no material chips are produced; said apparatus further comprising guide roller means associated with each cutter blade to maintain alignment of the cutter blade on the corresponding longitudinal corner during the cutting operation, and to maintain the rectangular configuration of the channel after one or more plates are severed.

2. The invention of claim 1 further comprising adjusting means for advancing said cutter blades inwardly toward the center of the tubular channel at the end of every other stroke of the reciprocating motion of said cutter blades.

3. The invention of claim 1 wherein each of said cutter blades is recessed to receive a corresponding longitudinal corner of the tubular channel, whereby each cutter blade is guided along the corner during the reciprocating motion.

4. Apparatus for disposing of a radioactive rectangular tubular fuel channel comprising elongated housing means for containing therein the tubular channel, and cutter means, mounted on said housing means, for cutting the channel along each longitudinal corner thereof until the channel is severed into four side plates, wherein said cutter means is mounted for longitudinal movement along the longitudinal corners of the tubular channel; said apparatus further comprising motive means for longitudinally moving said cutter means along each longitudinal corner until the channel is severed into four substantially equal rectangular side plates, said motive means comprising cable and pulley means, connected between said housing means and said cutter means, for producing the longitudinal movement of said cutter blades; said apparatus further comprising hydraulic means, mounted on the outside of said housing means, for driving said cable and pulley means in a reciprocating motion, said hydraulic means including a reciprocable piston coupled to said cable and pulley means, said cable and pulley means providing a mechanical advantage such that each stroke of said cutter blades is a multiple of each stroke of said piston.

5. Apparatus for disposing of a radioactive rectangular tubular fuel channel comprising elongated housing means for containing therein the tubular channel, and cutter means, mounted on said housing means, for cutting the channel along each longitudinal corner thereof until the channel is severed into four side plates; said apparatus further comprising mandrel means, secured to said housing means, and adapted to be disposed inside the tubular channel along at least a portion of the length thereof, said mandrel means being positioned inside each longitudinal corner opposite said cutter means to rotationally and axially position the tubular channel and to maintain its rectangular geometry during the cutting operation.

* * * * *